(12) United States Patent
Hudelmaier et al.

(10) Patent No.: US 6,227,478 B1
(45) Date of Patent: May 8, 2001

(54) LINEAR DRIVE FOR A BELT TENSIONER

(75) Inventors: Karl Hudelmaier; Thomas Mödinger, both of Alfdorf; Johannes Schmid, Schwäbisch Gmünd, all of (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/354,654

(22) Filed: Jul. 16, 1999

(30) Foreign Application Priority Data

Jul. 17, 1998 (DE) .......................................... 298 12 801 U

(51) Int. Cl.$^7$ .................................................. B60R 22/46
(52) U.S. Cl. ............................................................ 242/374
(58) Field of Search .......................... 242/374; 280/806; 297/478, 480; 60/638

(56) References Cited

U.S. PATENT DOCUMENTS

| 3,901,531 | 8/1975 | Prochazka . |
| 3,942,819 | 3/1976 | Schwanz et al. . |
| 5,450,723 | * 9/1995 | Fohl ..................................... 280/806 |
| 5,607,185 | * 3/1997 | Isaji et al. ............................ 280/806 |
| 5,641,131 | 6/1997 | Schmid et al. ....................... 242/374 |
| 5,842,344 | 12/1998 | Schmid ................................ 242/374 |

FOREIGN PATENT DOCUMENTS

| 685773 | 12/1939 | (DE) . |
| 2249786 | 4/1974 | (DE) . |
| 3629300 | 3/1988 | (DE) . |
| 4415103A1 | 4/1995 | (DE) . |
| 29520307 | 4/1996 | (DE) . |

* cited by examiner

*Primary Examiner*—John M. Jillions
(74) *Attorney, Agent, or Firm*—Tarolli, Sundheim, Covell, Tummino & Szabo L.L.P.

(57) ABSTRACT

A linear drive (10) for a belt tensioner has a cylinder tube (20) comprising at one axial end a face wall (33) provided with an opening (34). A piston (22) is arranged shiftably in the cylinder tube. The piston has a hollow inner space (24). A pyrotechnical propellant charge (28) is provided which following its ignition acts upon the inner space (24) of the piston (22) with compressed gas. To provide a cooling and a filtering function, a pad (44) of a wire conglomerate is arranged within the cylinder tube adjacent the face wall (33) of the cylinder tube.

9 Claims, 3 Drawing Sheets

LINEAR DRIVE FOR A BELT TENSIONER

FIELD OF THE INVENTION

The invention relates to a linear drive for a /belt tensioner.

BACKGROUND OF THE INVENTION

A linear drive is known from DE 44 15 103 A1, corresponding to U.S. Pat. No. 5,641,131. The linear drive has a cylinder tube with an end wall provided with an opening. A piston is arranged shiftably in the cylinder tube. The piston comprises a hollow inner space. A pyrotechnical propellant charge is provided which following its ignition acts upon the inner space of the piston with compressed gas. When required, the propellant charge is ignited so that the piston as affected by the generated gas executes a tensioning stroke which is translated from the belt tensioner into a rotation of a belt reel of a belt retractor in the coiling direction, as a result of which the so-called belt slack is taken up from the belt system so that in case of a collision the vehicle occupant is involved in the vehicle delay as early as possible.

One problem with such a linear drive involves assuring that even when the propellant charge is ignited under unfavorable conditions, e.g. misuse, overheating due to a vehicle fire or blockage of the spindle of the connected belt retractor, the propellant charge of parts of the linear drive pose no risk of injury whatsoever. It is known from DE-GM 295 20 307 to provide the face wall of the piston with a passage which is covered by a bursting disc on the side of the inner space of the piston. When an excessively high pressure exists in the inner space of the piston the bursting disc opens up the passage so that this pressure is able to escape from the inner space of the piston and prevent bursting of the cylinder tube without the latter needing to be designed particularly rugged. In this arrangement, dimensioning the bursting disc accordingly enables the pressure occurring in the inner space of the piston to be set as a maximum and adapted to the conditions in each case. The bursting disc is furthermore provided with a calibrated gas exit opening opposite the passage. In addition to restricting the pressure occurring maximally in the inner space of the piston this design also offers advantages as regards the response of the linear drive after a belt tensioning action has occurred when the belt reel is connected to a means of energy absorption such as a torsion bar which absorbs load peaks in the belt system.

The problem remains, however, that following ignition of the propellant charge a flow of hot gas emerges from the opening in the bursting disc which involve a flame. When the bursting disc is broken open due to a prohibitively high pressure, fragments may be catapulted out of the cylinder tube. By the present invention these problems too, are eliminated.

SUMMARY OF THE INVENTION

In accordance with the invention a pad of a wire conglomerate is arranged on the inner side of the face wall of the cylinder tube. The pad is multi-functional. For one thing, it cushions the impact of the piston at the axial end of the cylinder tube. For another, it absorbs the fragments of the bursting disc, cools the hot gases and prevents emergence of a flame.

In the preferred embodiment the pad consists of a hose-like sheath and a filling. The filling may in turn consist of a rolled-up hose structure or of steel wool. The axial ends of the sheath are closed off, more particularly by twisting so that the pad in all has a defined cylindrical shape and can be inserted into the cylinder tube with radial compression. The pad has a considerable axial length of preferably approximately 40 mm and is compressed on being impinged by the piston to an axial length of the order of magnitude of a millimeter, as a result of which the stroke of the piston is not reduced, or merely unsubstantially so.

BRIEF DESCRIPTION OF DRAWINGS

The invention will now be described with reference to preferred embodiments as shown in the attached drawing in which.

DESCRIPTION OF PREFERRED EMBODIMENT

Figure 1:
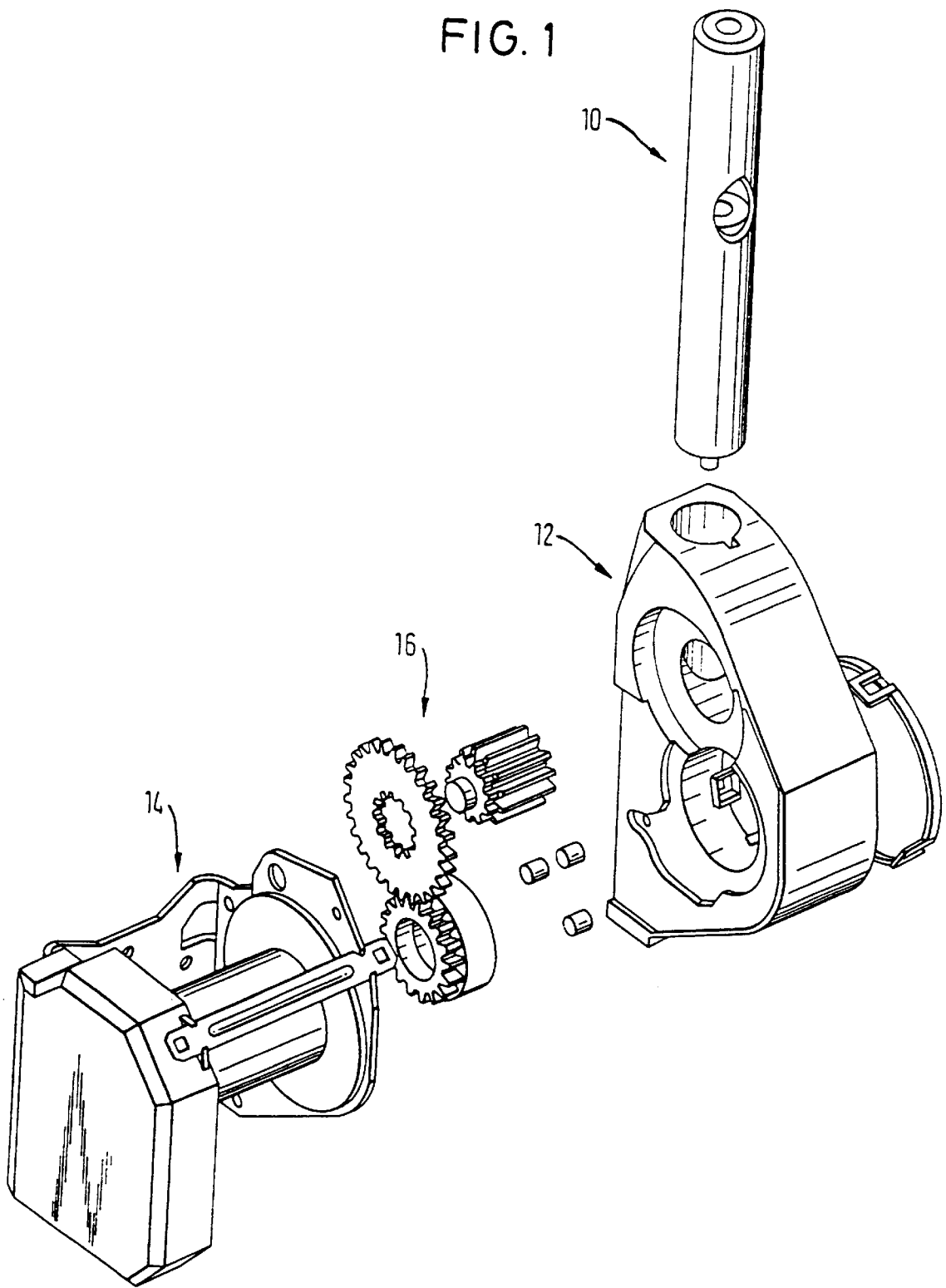
FIG. 1 is a schematic view of a linear drive in accordance with the invention with a belt tensioner and a belt retractor.

Referring now to FIG. 1 there is illustrated an exploded view of a linear drive 10 in accordance with the invention as well as an associated belt reel 12 and a belt retractor 14, the belt tensioner 12 engaging the belt retractor 14 by means of a single-ratio gearing 16.

Figure 2:
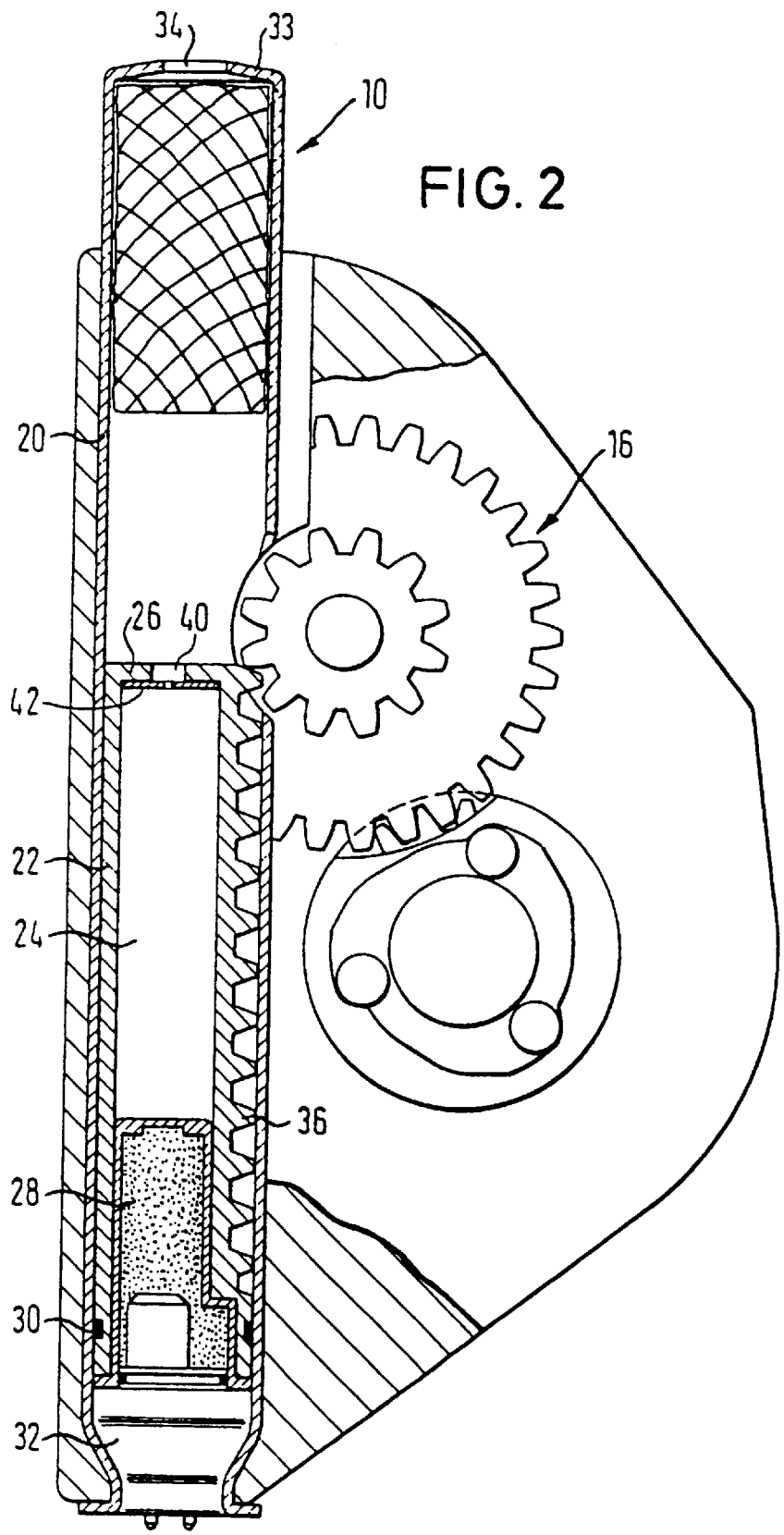
FIG. 2 is a schematic view of a section through a linear drive in accordance with the invention according to a first embodiment as shown in the starting position.

Referring now to FIG. 2 it is evident that the linear drive 10 consists of a cylinder tube 20 and a piston arranged shiftable therein. The piston comprises a hollow inner space 24 comprising at one axial end a face wall 26 and at the opposite axial end a pyrotechnical propellant charge 28. Arranged between the cylinder tube 20 and the piston 22 at the latter is a sealing ring 30. At the end, at the bottom as shown in FIG. 2, the cylinder tube 22 is closed off by a plug 32 which also carries the ignition contacts for igniting the propellant charge 28. At its opposite end the cylinder tube 20 is provided with a piston catcher 33 with a opening 34, this opening 34 serving to vent the cylinder tube 20 on a tensioning stroke of the piston 22.

On its sleeve surface the piston 22 comprises a toothing 36 extending parallel to the longitudinal axis of the piston, this toothing being able to cooperate with a gearwheel of the gearing 16 to translate a tensioning stroke of the piston 22 into a rotational movement which is transmitted as a rotation in the belt webbing coiling direction to the belt reel of the belt retractor 14. Such a tensioning stroke is activated by the propellant charge 28 being ignited. This generates a compressed gas which impacts the inner space of the piston and thus results in a displacement of the piston 22 in the cylinder tube 20.

A pad 44 consisting of a wire conglomerate is inserted in the cylinder tube 20 near to the face wall 33 so that it covers the opening 34. The pad 44 has a considerable axial length of approximately 40 millimeters. The pad is composed of an outer sleeve consisting of a fine wire mesh, and a filling. The filling consists preferably in turn of a rolled-up hose structure of a wire mesh. The wire gauge of the sheath is finer than that of the fill. The axial ends of the sheath are closed by twisting so that the fill is unable to drop out. Prior to being inserted into the cylinder tube 20 the outer diameter of the pad 44 is somewhat larger than its inner diameter so that it can be inserted with radial compression.

Figure 3:
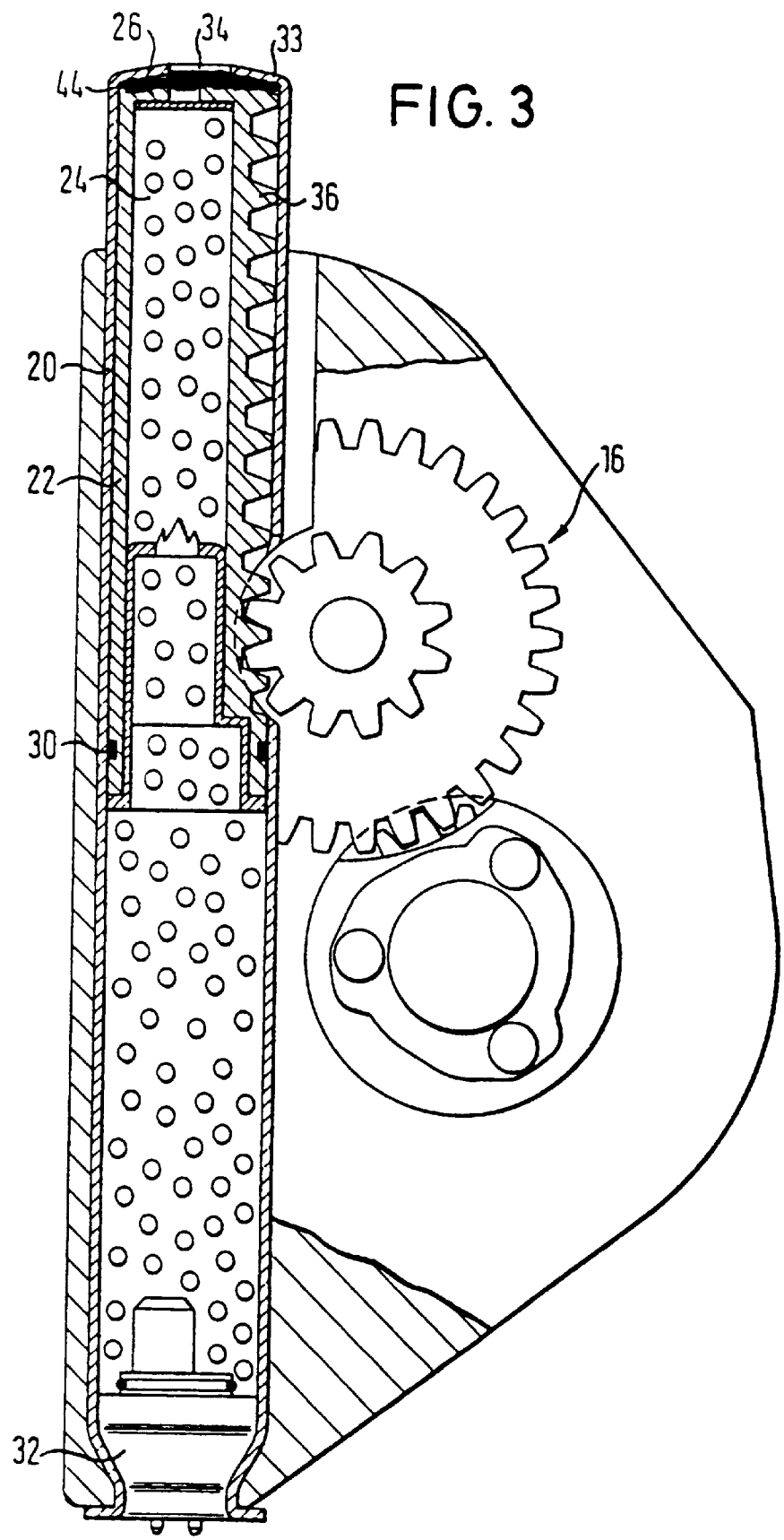
FIG. 3 is a schematic view of a section through the linear drive as shown in FIG. 2 after the tensioning stroke has occurred.

Referring now to FIG. 3 it is evident that the pad 44 is totally pushed together, when the piston 22 has attained the end of its stroke, and thus forms a disk which is now only relatively thin. The pad 44 damps the impact of the piston 22 on the face wall 33 of the cylinder tube. Furthermore, it safely prevents emergence of fragments, having resulted, for example, from bursting of the bursting disc 42. Also safely prevented is the emergence of a flame from the opening 34. In conclusion the hot gases liberated on combustion of the propellant charge are cooled by the pad 44.

What is claimed is:

1. A linear drive for a belt tensioner, comprising:

a cylinder tube with an end wall at an axial end and an opening in said end wall, a piston shiftably accommodated in said cylinder tube, said piston comprising a hollow inner space, and a pyrotechnical propellant charge adapted to generate compressed gas acting upon said inner space of said piston over a piston stroke within said cylinder tube, a pad of wire conglomerate being arranged within said cylinder tube adjacent said end wall, said piston having an axial end facing said end wall of said cylinder, said axial piston end having a passage therein, said passage being internally covered by a burst disc, said pad being initially elongated and being axially compressed to a thin disc by said piston after said piston has reached an end of the piston stroke.

2. The linear drive as set forth in claim 1, wherein said pad comprises a hose-like sheathing and a filling.

3. The linear drive as set forth in claim 2, wherein said hose-like sheathing is formed of a wire mesh.

4. The linear drive as set forth in claim 3, wherein said sheathing is closed at both its axial ends by twisting.

5. The linear drive as set forth in claim 2, wherein said filling is formed by a rolled-up hose structure of a wire mesh.

6. The linear drive as set forth in claim 2, wherein said filling consists of steel wool.

7. The linear drive as set forth in claim 2, wherein said sheathing has a wire gauge which is finer than that of said filling.

8. The linear drive as set forth in claim 1, wherein said pad has an axial length of approximately 40 mm.

9. The linear drive as set forth in claim 1, wherein said pad is inserted into said cylinder tube with radial compression.

* * * * *